UNITED STATES PATENT OFFICE.

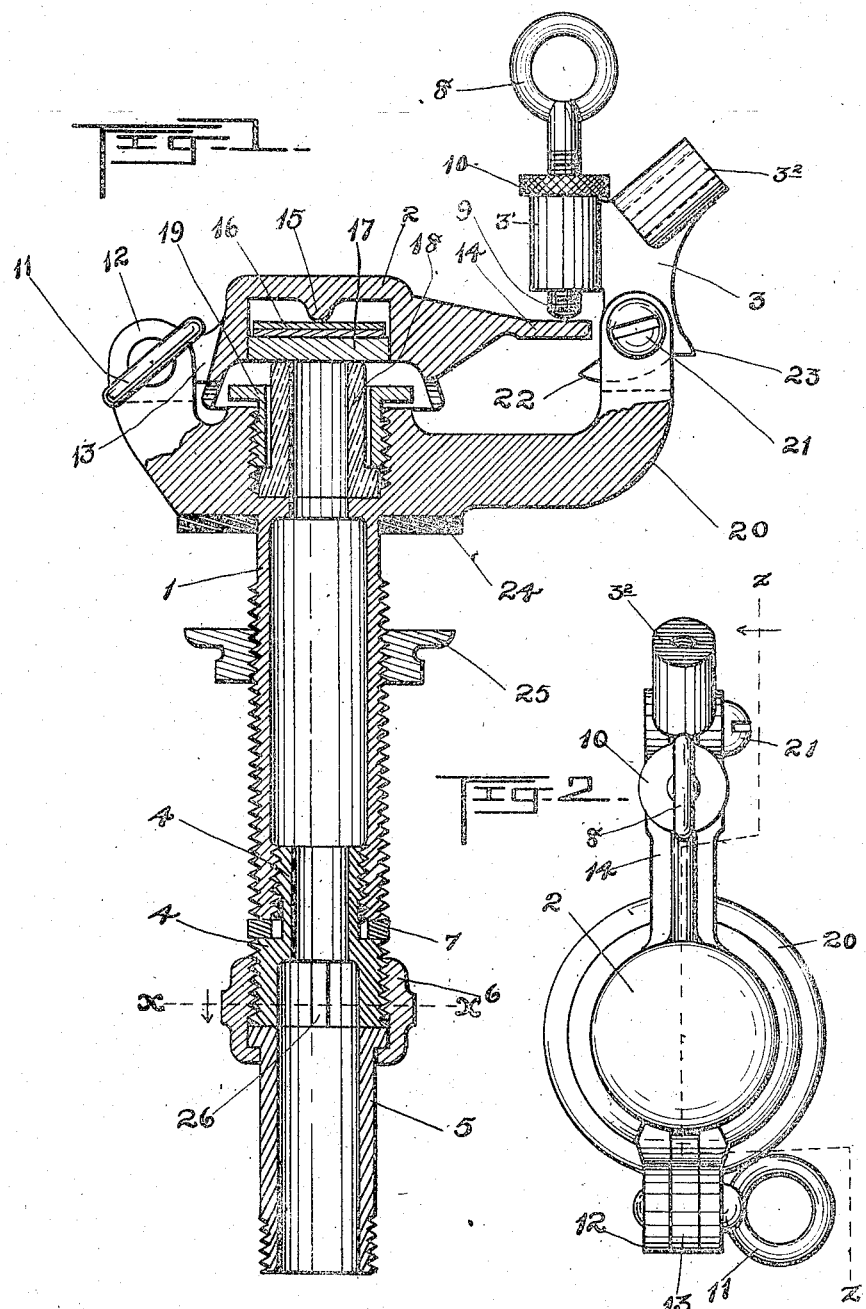

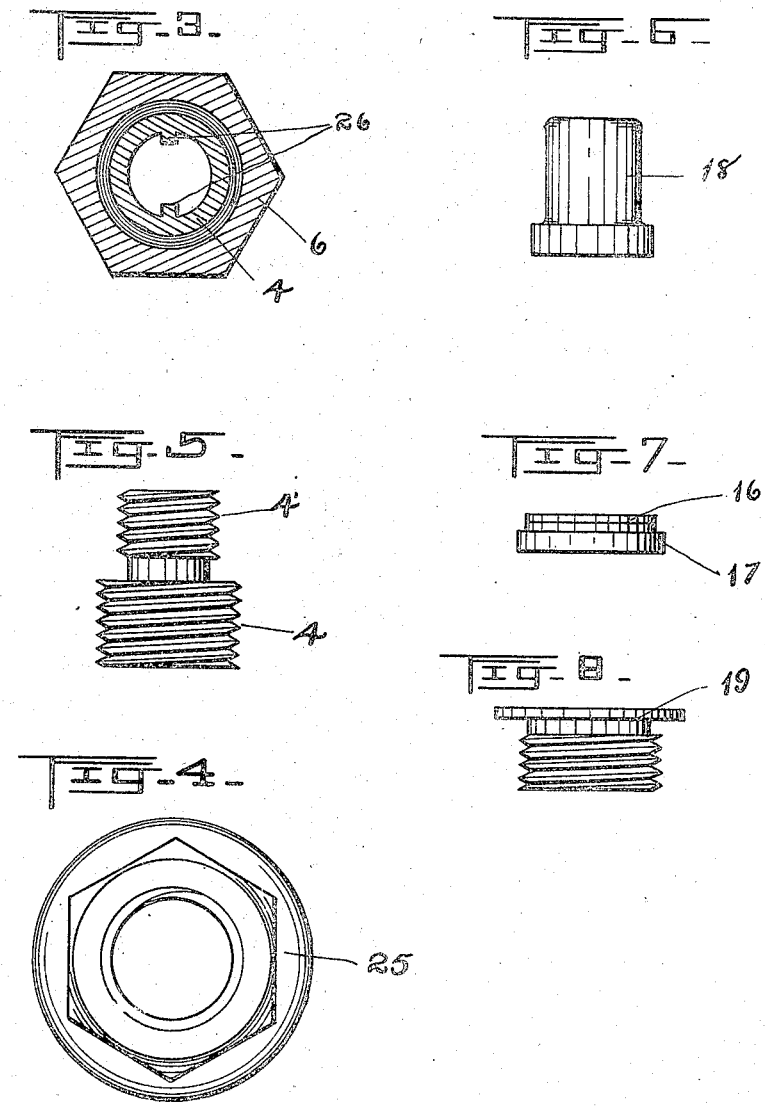

LOUIS A. CORNELIUS, OF GRAND RAPIDS, MICHIGAN.

VALVE APPARATUS FOR TANKS.

No. 924,432.   Specification of Letters Patent.   Patented June 8, 1909.

Application filed December 5, 1908. Serial No. 466,115.

*To all whom it may concern:*

Be it known that I, LOUIS A. CORNELIUS, a citizen of the United States, residing at Grand Rapids, in the county of Kent and State of Michigan, have invented new and useful Improvements in Valve Apparatus for Tanks, of which the following is a specification.

This invention relates to new and useful improvements in valve apparatus for tanks, and its object is to provide some particularly efficient means for holding and operating the inlet valves used for tanks and water closets or other similar uses, and for connecting such fixtures to the water pipes. This object I accomplish by the construction shown in the accompanying drawings, in which—

Figure 1 is a vertical longitudinal section of my device when applied, and with the valve closed, certain portions being shown in side plan instead of in section, and the sectional part being indicated by the line z—z of Fig. 2. Fig. 2 is a top view of the device in the same position shown in Fig. 1. Fig. 3 is a horizontal cross-section on the line x—x of Fig. 1. Fig. 4 is a detailed view of the clamping nut binding against the bottom of the tank. Fig. 5 is a detailed view of the connection between the supply pipe and the inlet pipe of this device. Fig. 6 is a detail of the removable tip of the inlet pipe. Figs. 7 and 8 are further details of portions of the valve.

The numeral 1 represents the inlet pipe of this apparatus. This pipe is designed to pass through the bottom of the tank or other receptacle to which the device is applied a suitable hole being provided therefor.

2 is a cup valve designed to close down upon and over the upper top of the inlet pipe.

3 is a pivoted arm carrying the stem 3² of the ball or other float, which, by the rising and falling action of the water automatically operates the valve, and 3' is a threaded socket or sleeve attached to this lever arm 3 and adapted to receive an adjustable screw.

4 is a connection having the upwardly-extending reduced portion 4', both portions being externally threaded.

5 is the supply pipe conveying the water and 6 is the internally screw-threaded flanged nut for connecting the supply pipe to the connection 4.

7 is a washer or packing making a tight joint between the parts 4 and 1.

8 is the head of the screw 9 vertically adjustable in the socket 3' and held in the desired adjustability by the lock nut 10.

11 is a screw with a suitable head for convenient turning, which screw detachably connects the lug 12 attached to the main inlet pipe casting and the pivoted arm 13, carrying the cup valve 2. At the other end of this arm is a suitable lug or extension 14 adapted to bear against the adjustable screw 9.

15 is a central, downwardly-projecting boss or point on the lower surface of the cup valve 2.

16 indicates a metallic, rigid washer or plate of circular form to correspond with the interior of the cup chamber 2, but of materially less diameter so that the same may tilt or rock quite freely upon the point 15 and without binding against the sides of the chamber.

17 is a compressible washer of any customary material, and of a diameter normally a trifle greater than the diameter of the cup chamber, so that it must be slightly crowded or pushed to insert it therein, and so that it will not drop out of position by its own weight when the cup valve is raised.

18 is a removable tip provided with an external flange at its lower end and of an internal diameter suitably corresponding to the diameter of the adjacent portion of the inlet pipe, and constructed of porcelain, glass or some similar very hard and non-corrosive material.

19 is a flanged binding nut externally threaded and engaging with an interior thread in a suitable socket in the main body of the inlet pipe head.

20 represents the head of the inlet pipe casting extended into the circular flange which bears upon the upper surface of the tank bottom, as indicated especially in Fig. 2, and with one point prolonged or extended so as to carry in suitable position the lever arm 3, as especially indicated in Fig. 1.

21 is the removable screw pivot connecting the lever arm 3 with its supporting extension 20.

22 is a lug or short arm upon the lower inner corner of lever arm 3, adapted to make engagement with and positively raise the cup valve, and 23 is a corresponding lug or projection upon the opposite lower corner adapted to stop and limit, at a proper point, the downward motion of the lever arm 3.

24 is a suitable packing or washer interposed between the upper surface of the tank bottom and the lower surface of the flange or head 20.

25 is the binding nut for the under surface of the tank bottom.

26 represents opposing lugs in the inner side of the connection 4 and extending down approximately to the bottom thereof, whereby this extension can be turned by a suitable wrench.

The general operation of the device is obvious, and not dissimilar from others of the same class. I, therefore, do not describe it in detail; and with reference to the removable tip and self-adjusting valve hereafter described, it is especially intended as an improvement upon Patent No. 605,084, issued June 7, 1898 to Bert Dale, in which patent the general construction of these parts is described and shown.

It is necessary to fit devices of this kind to a great variety of supply pipes differing in size, in the form of the screw-thread, etc., and it has been customary for this purpose for the manufacturer to make a considerable number of different forms of his device, each form supplied with an inlet pipe of different size, shape or form. I avoid this difficulty by using in all cases the same inlet pipe and by furnishing a variety of extensions or connections 4. The upward extension 4' of this part is made of a size and provided with a screw-thread adapted to engage with the regular standard inlet pipe section of my device, while the lower portion of the connection will be of any suitable size, and with any suitable thread, adapted to engage as shown, directly or indirectly, or with any kind or form of supply pipe, and the supply pipe section 5 will be provided of suitable size and form to be attached to the main supply pipe already in position. In this manner I provide a series of assorted sizes of the connection 4 and its associated parts, as the section 5 and the connecting nut 6, and in this way can attach and adjust my standard feature, always of one size, to any place where its use may be desired.

The tip of the inlet pipe is sometimes difficult to maintain in proper condition. A slight defect in the casting, or an injury received in handling or setting up, making a break or an unevenness too slight to be observed, or the ordinary effect of corrosion operating unequally around the tip, will produce a slight inequality which is not closed by the valve and which permits a troublesome leak. In endeavoring to supply a removable tip of some non-corrosive material, I have employed, as the most suitable material, porcelain or glass, or some vitreous substance, but I have also found that inequalities and unevenness are difficult to avoid, and that a tip of such material can not easily be ground to a smooth, even edge, as can be done with metal by machinery. It is also apparent that in using a removable tip held in position by a binding nut, or some other means, there is additional liability, through imperfections in manufacture, or through the wear of the thread, or for other reasons, of the tip not being in perfect alinement with the inlet pipe. All these qualities lead to the special necessity of a valve which will automatically adjust itself to the plane of the surface of the tip. A further necessity for this same self-adjustment is found in the fact that with use, the horizontal plane of the cup valve closure will change, and that since this swings in the arc of a circle, a rigid valve which would be absolutely tight when in its position of original adjustment would not be tight when the adjustment had been changed by wear or from accidental cause. I accomplish this self-adjustment by providing in the interior chamber of the cup valve three co-acting parts, viz., the central bearing point, the rigid washer of a smaller diameter than the chamber and the flexible washer of equal or greater diameter than the chamber. It is evident that the flexible washer must be supported and backed throughout its entire operating surface by a rigid, unyielding plane surface follower, and that this plane surface, in order to adjust itself to variations between the plane of the tip and the normal plane of the cup valve, must rock or tilt upon a central point. It is obvious, also, that if this rigid surface consists of a washer or plunger of the full diameter of the chamber, such rocking or tilting would be prevented, but that by making this washer of a firm and rigid substance, as metal, and by making it distinctly smaller in diameter than the interior of the chamber, it is permitted to rock or tilt so as to adapt itself to the plane of the tip, and at the same time will always receive, through the point 15, a substantially central pressure causing it to exert equal pressure in all parts of its lower surface. The flexible washer 17, if it is fitted loosely upon the cup chamber, would not only have a tendency to drop down upon the tip when the valve was open, letting the rigid washer also drop and causing play or noise, but would not be positively lifted with the lifting of the cup valve, and might adhere to and remain upon the upper edge of the tip. I, therefore, make this washer of leather, or some similar material, and of distinctly larger diameter than the diameter of the chamber, so that it has to be crowded or forced into the position shown in Fig. 1, and will be thereby held with all sufficient firmness to retain itself and the adjacent metallic washer in position, both when the device is in use and during the preliminary setting up or adjustment; and at the same time will be sufficiently flexible to be forced by the washer above it into tight contact with the entire periphery of the edge of the tip. I have found that by this described combination, I can successfully use a removable porcelain tip and that the difficulties in such use are practically overcome. It not only insures a better operation of the valve in many respects, but permits an easy renewal of either or both contact faces in the valve, thereby prolonging the life of the fixture and without interfering with the main body thereof, or with its attachment to and adjustment in the tank. By this construction I may also use, without other change or alteration, a plurality of washers 16, as indicated in Fig. 7 and in Fig. 1, and I can thereby easily compensate for varying thickness in the flexible washer 17 or for compression thereby by use, and can otherwise make more perfect adjustment.

Having thus described my invention, what I claim to have invented, and desire to secure by Letters Patent, is—

1. The combination of the main body of the fixture carrying the inlet pipe, a removable tip for such inlet pipe, means for securing such tip in the fixture body in alinement with the inlet pipe, a hinged cup valve for closing such tip, a float-carrying lever arm for automatically raising and lowering such hinged valve, a compressible washer contained in and carried by such cup valve, a metallic follower for such flexible washer, such metallic follower being of less diameter than the interior of the cup chamber so as to permit a rocking motion therein and a centrally located bearing lug in the top of such chamber bearing upon such follower.

2. The combination of the main body of the fixture carrying the inlet pipe, a removable tip of vitreous material for such inlet pipe, means for securing such tip in the fixture body in alinement with the inlet pipe, a hinged cup valve for closing such tip, a float-carrying lever arm for automatically raising and lowering such hinged valve, a compressible washer contained in and carried by such cup valve, a metallic follower for such flexible washer, such metallic follower being of less diameter than the interior of the cup chamber so as to permit a rocking motion therein and a centrally located bearing lug in the top of such chamber bearing upon such follower.

3. In a valve fixture for tanks, the combination of the inlet pipe, a removable tip therefor, a hinged cup valve for closing said tip provided with a self supporting rocking washer, and a float carrying lever arm for automatically opening and closing said valve.

4. In a valve fixture for tanks, the combination of the inlet pipe, a removable tip therefor, a hinged cup valve for closing said tip provided with a compressible self supporting rocking washer fitted into the cup of said valve for closing said tip, and a float carrying lever arm for automatically opening and closing said valve.

5. In a valve fixture for tanks, the combination of the inlet pipe, a hinged cup valve having a central lug projecting into its cup, a compressible self supporting rocking washer fitted into said cup for closing the tip of the inlet valve, a stiff backing for said washer bearing against the lug of said valve, and means for automatically opening and closing said valve.

In testimony whereof I have hereunto set my hand in presence of two subscribing witnesses.

LOUIS A. CORNELIUS.

Witnesses:
MARY S. TOOKER,
MARY SCHULTE.